US009304774B2

(12) United States Patent
Dockser et al.

(10) Patent No.: US 9,304,774 B2
(45) Date of Patent: Apr. 5, 2016

(54) PROCESSOR WITH A COPROCESSOR HAVING EARLY ACCESS TO NOT-YET ISSUED INSTRUCTIONS

(75) Inventors: Kenneth Alan Dockser, Cary, NC (US); Yusuf Cagatay Tekmen, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 861 days.

(21) Appl. No.: 13/363,541

(22) Filed: Feb. 1, 2012

(65) Prior Publication Data

US 2012/0204005 A1 Aug. 9, 2012

Related U.S. Application Data

(60) Provisional application No. 61/439,608, filed on Feb. 4, 2011.

(51) Int. Cl.
*G06F 9/30* (2006.01)
*G06F 9/38* (2006.01)

(52) U.S. Cl.
CPC .............. *G06F 9/3814* (2013.01); *G06F 9/382* (2013.01); *G06F 9/3836* (2013.01); *G06F 9/3859* (2013.01); *G06F 9/3877* (2013.01); *G06F 9/3885* (2013.01)

(58) Field of Classification Search
CPC ... G06F 9/3885; G06F 9/3836; G06F 9/3877; G06F 9/382
USPC .......................................................... 712/34
See application file for complete search history.

(56) References Cited

U.S. PATENT DOCUMENTS

| | | | | |
|---|---|---|---|---|
| 6,002,881 A | * | 12/1999 | York et al. | 712/34 |
| 6,134,650 A | * | 10/2000 | Zuraski et al. | 712/213 |
| 6,832,305 B2 | | 12/2004 | Park et al. | |
| 6,944,746 B2 | | 9/2005 | So | |
| 7,089,393 B2 | * | 8/2006 | Carpenter et al. | 711/201 |
| 7,237,094 B2 | * | 6/2007 | Curran et al. | 712/213 |
| 7,600,096 B2 | | 10/2009 | Parthasarathy et al. | |
| 7,647,475 B2 | | 1/2010 | Svendsen et al. | |
| 2008/0059765 A1 | | 3/2008 | Svendsen et al. | |
| 2008/0059771 A1 | * | 3/2008 | Svendsen et al. | 712/218 |
| 2008/0270758 A1 | * | 10/2008 | Ozer et al. | 712/206 |
| 2010/0153686 A1 | | 6/2010 | Frank | |
| 2010/0281239 A1 | | 11/2010 | Sudhakar et al. | |
| 2012/0066483 A1 | * | 3/2012 | Boury et al. | 712/233 |

OTHER PUBLICATIONS

International Search Report and Written Opinion—PCT/US2012/023998—ISA/EPO—Mar. 23, 2012.

* cited by examiner

*Primary Examiner* — Andrew Caldwell
*Assistant Examiner* — Yuqing Xiao
(74) *Attorney, Agent, or Firm* — Peter Michael Kamarchik; Paul Holdaway

(57) ABSTRACT

Apparatus and methods provide early access of instructions. A fetch queue is coupled to an instruction cache and configured to store a mix of processor instructions for a first processor and coprocessor instructions for a second processor. A coprocessor instruction selector is coupled to the fetch queue and configured to copy coprocessor instructions from the fetch queue. A queue is coupled to the coprocessor instruction selector and from which coprocessor instructions are accessed for execution before the coprocessor instruction is issued to the first processor. Execution of the copied coprocessor instruction is started in the coprocessor before the coprocessor instruction is issued to a processor. The execution of the copied coprocessor instruction is completed based on information received from the processor after the coprocessor instruction has been issued to the processor.

24 Claims, 8 Drawing Sheets

PROCESSOR WITH A COPROCESSOR HAVING EARLY ACCESS TO NOT-YET ISSUED INSTRUCTIONS

The present Application for Patent claims priority to Provisional Application No. 61/439,608 entitled "Processor with a Coprocessor having Early Access to Not-Yet Issued Instructions" filed Feb. 4, 2011, and assigned to the assignee hereof and hereby expressly incorporated by reference herein.

FIELD OF THE INVENTION

The present invention relates generally to techniques for organizing and managing an instruction queue in a processing system and, more specifically, to techniques for providing early access to not-yet issued instructions.

BACKGROUND OF THE INVENTION

Many products, such as cell phones, laptop computer, personal digital assistants (PDA), desktop computers, or the like, incorporate one or more processors executing programs that support communication and multimedia applications. The processors need to operate with high performance and efficiency to support the plurality of computationally intensive functions for such products.

The processors operate by fetching instructions from a unified instruction fetch queue which is generally coupled to an instruction cache. There is often a need to have a sufficiently large in-order unified instruction fetch queue supporting the processors to allow for the evaluation of the instructions for efficient dispatching. For example, in a system having two or more processors that share a unified instruction fetch queue, one of the processors may be a coprocessor. In such a system, it is often necessary to have a coprocessor instruction queue downstream from the unified instruction fetch queue. This downstream queue should be sufficiently large to minimize backpressure on processor instructions in the instruction fetch queue to reduce the effect of coprocessor instructions on the performance of the processor. Also, coprocessor instructions may require more processing stages to execute than the main processor. If there are instructions that require synchronization between the two processors, such a disparity in execution times can create performance bottlenecks. In addition, large instruction queues may be cost prohibitive in terms of power use, implementation area, and impact to timing and performance to provide the support needed for coprocessor instructions.

SUMMARY

Among its several aspects, the present invention recognizes a need for improved techniques for managing an instruction queue in a multiple processor system. To such ends, an embodiment of the invention applies a method for early access of instructions. A coprocessor instruction is copied from an instruction fetch queue, wherein the instruction fetch queue stores a mix of coprocessor instructions and processor instructions. Execution of the copied coprocessor instruction is started in the coprocessor before the coprocessor instruction is issued to a processor. The execution of the copied coprocessor instruction is completed based on information received from the processor after the coprocessor instruction has been issued to the processor.

Another embodiment of the invention addresses an apparatus for early access of instructions. A fetch queue is coupled to an instruction cache and configured to store a first class of instructions for a first processor and a second class of instructions for a second processor. A second class instruction selector is coupled to the fetch queue and configured to copy second class instructions from the fetch queue. A queue is coupled to the second class instruction selector and from which second class instructions are accessed for execution before the second class instruction is issued to the first processor.

Another embodiment of the invention addresses a method for starting execution of not-yet issued instructions. A plurality of coprocessor instructions is copied from an instruction fetch queue, wherein the instruction fetch queue stores a mix of coprocessor instructions and processor instructions in program order. Execution of the plurality of copied coprocessor instructions is started in the coprocessor before the plurality of coprocessor instructions are issued to a processor, wherein the execution of the plurality of copied coprocessor instructions is completed based on information generated by the processor in response to an evaluation of the plurality of coprocessor instructions issued to the processor.

Another embodiment of the invention addresses apparatus for early access of instructions. Means for storing a first class of instructions for a first processor and a second class of instructions for a second processor in a fetch queue coupled to an instruction cache. Means for copying second class instructions from the fetch queue. Means for accessing second class instructions for execution before the second class instruction is issued to the first processor.

Another embodiment of the invention addresses a computer readable non-transitory medium encoded with computer readable program data and code for operating a system. A coprocessor instruction is copied from an instruction fetch queue, wherein the instruction fetch queue stores a mix of coprocessor instructions and processor instructions. Execution of the copied coprocessor instruction is started in the coprocessor before the coprocessor instruction is issued to a processor. The execution of the copied coprocessor instruction is completed based on information received from the processor after the coprocessor instruction has been issued to the processor.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be initially written in a high level programming language such as C, C++, JAVA®, Smalltalk, JavaScript®, Visual Basic®, TSQL, Perl, or in various other programming languages. A program written in one of these languages is compiled to a target processor architecture by converting the high level program code into a native assembler program. Programs for the target processor architecture may also be written directly in the native assembler language. A native assembler program uses instruction mnemonic representations of machine level binary instructions specified in a native instruction format, such as a 32-bit native instruction format. Program code or computer readable medium as used herein refers to machine language code such as object code whose format is understandable by a processor.

Figure 1:
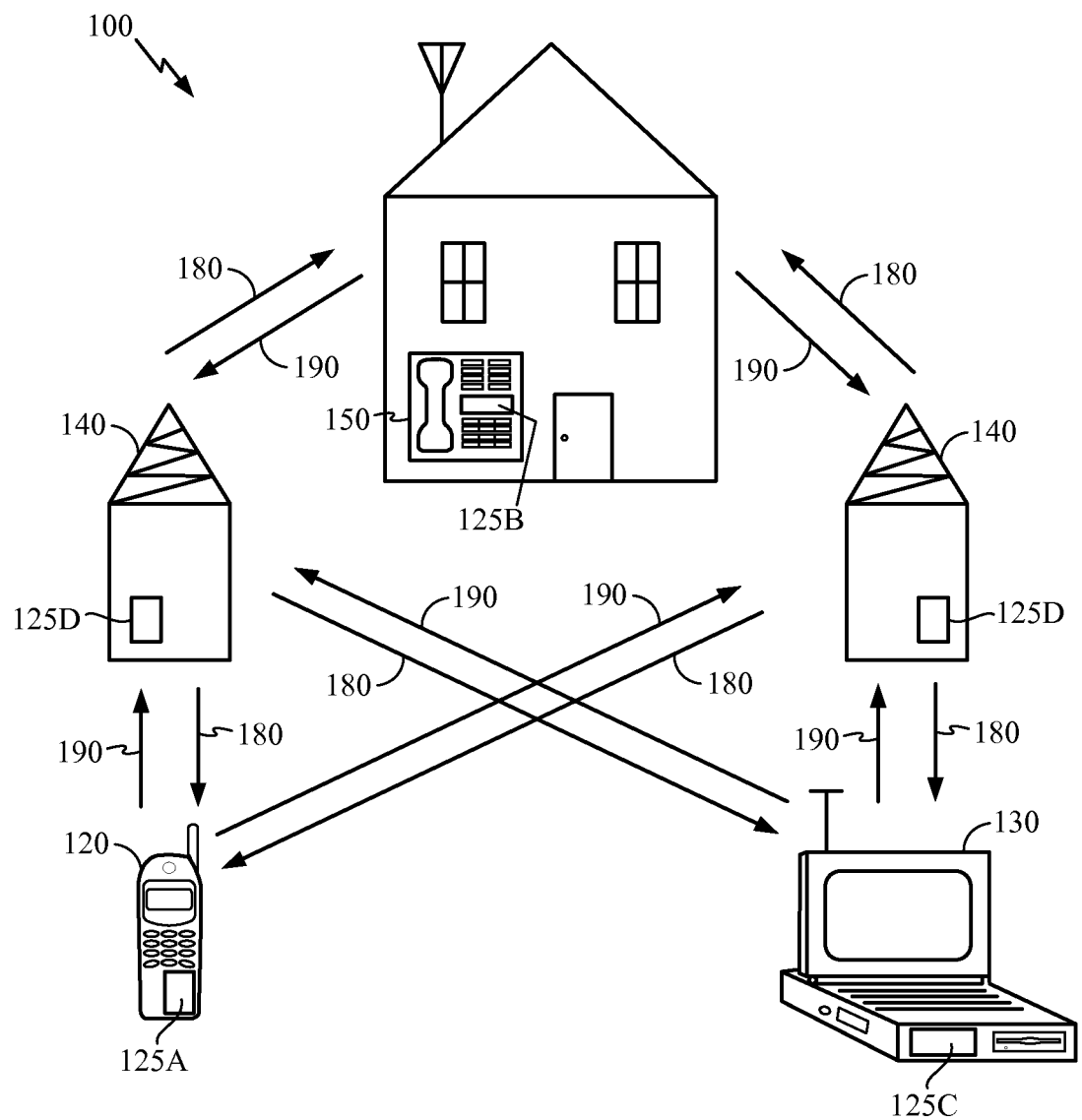
FIG. 1 is a block diagram of an exemplary wireless communication system in which an embodiment of the invention may be advantageously employed.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal digital assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processor system having a two or more processors sharing an instruction queue.

In a system having two or more processors that share an instruction fetch queue, one of the processors may be a coprocessor, such as a vector processor, a single instruction multiple data (SIMD) processor, or the like. In such a system, an additional instruction queue may be utilized to minimize backpressure on processor instructions reducing the effect of coprocessor instructions in the instruction fetch queue on the performance of the processor. In order to improve on the performance of the coprocessor, the coprocessor is configured to process coprocessor instructions not having dependencies in an out-of-order sequence. Large queues may be cost prohibitive in terms of power use, implementation area, and impact to timing and performance to provide the support needed for tracking the program order of the instructions in the queue.

Queues may be implemented as in-order queues or out-of-order (OoO) queues. In-order instruction queues are basically first-in first-out (FIFO) queues that are configured to enforce a strict ordering of instructions. The first instructions that are stored in a FIFO queue are the first instructions that are read out, thereby tracking instructions in program order. Since many instructions that do not have dependencies can execute out of order, the strict FIFO order prevents executable out-of-order instructions from being executed. An out-of-order instruction queue, as used herein, is configured to write instructions in-order and to access instructions out-of-order. Such OoO instruction queues are more complex as they require an additional means of tracking program order and dependencies between instructions, since instructions in the queue may be accessed in a different order than they were entered. Also, the larger an OoO instruction queue becomes, the more expensive the tracking means becomes.

A processor complex instruction queue of the present invention consists of a combination of a processor instruction fetch queue and a coprocessor instruction queue. The processor instruction fetch queue is configured as a FIFO in-order instruction queue and stores a plurality of processor instructions and coprocessor instructions according to a program ordering of instructions. The coprocessor instruction queue is configured as a hybrid queue comprising an in-order FIFO queue and an out-of-order queue. The coprocessor instruction queue is coupled to the processor instruction fetch queue, from which coprocessor instructions are accessed out-of-order with respect to processor instructions and accessed in-order with respect to coprocessor instructions.

Figure 2A:
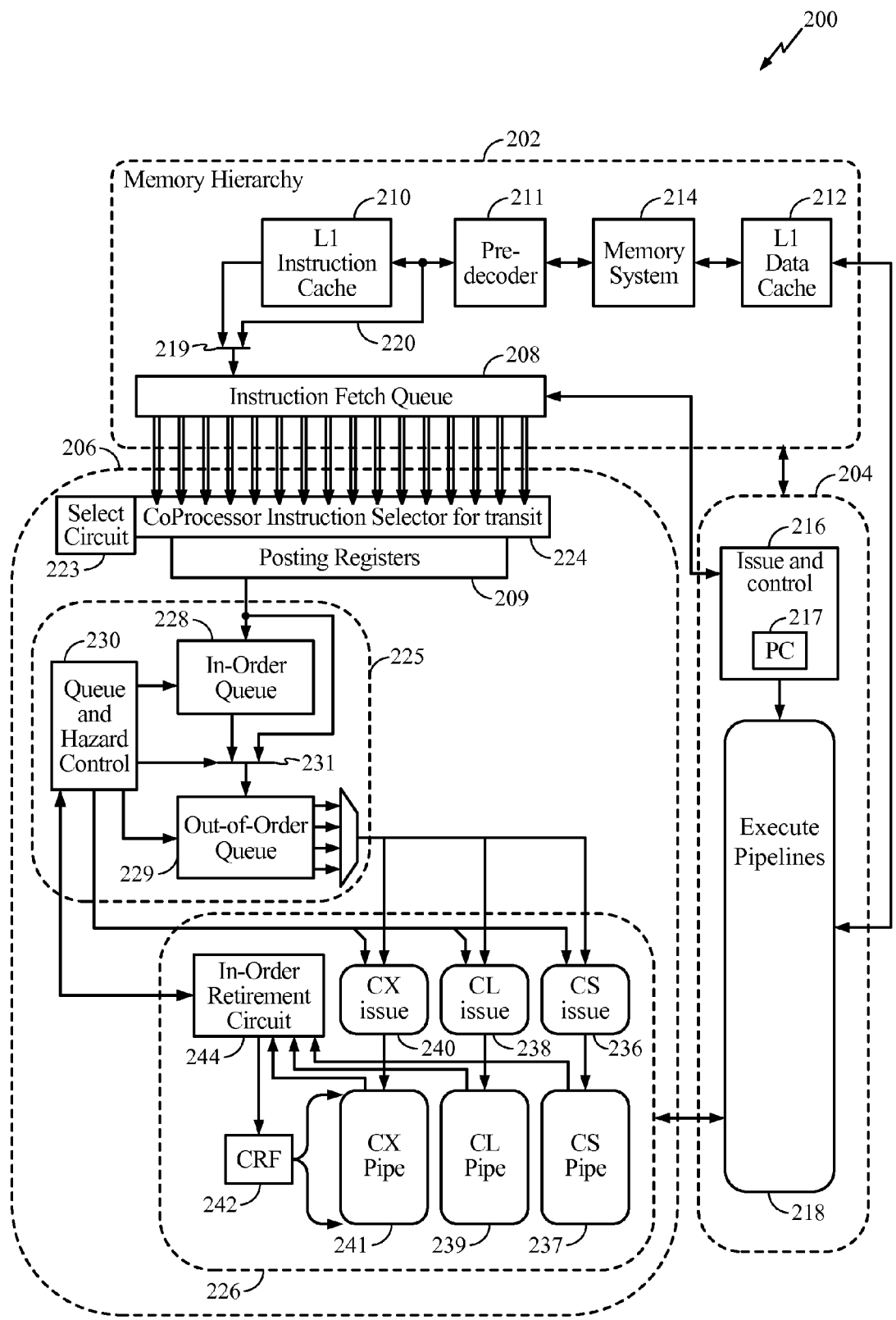
FIG. 2A illustrates a processor complex with a memory hierarchy, processor, and a coprocessor in which an embodiment of the invention may be advantageously employed.

FIG. 2A illustrates a processor complex 200 with a memory hierarchy 202, processor 204, and a coprocessor 206. The memory hierarchy 202 includes an instruction fetch queue 208, a level 1 instruction cache (L1 I-cache) 210, a predecoder 211, a level 1 data cache (L1 D-cache) 212, and a memory system 214. While the instruction fetch queue 208 is shown in the memory hierarchy 202 it may also be suitably located in the processor 204 or in the coprocessor 206. Instructions are written to the instruction fetch queue 208 in-order program order as fetched. Peripheral devices which may connect to the processor complex are not shown for clarity of discussion. The processor complex 200 may be suitably employed in hardware components 125A-125D of FIG. 1 for executing program code that is stored in the L1 I-cache 210, utilizing data stored in the L1 D-cache 212 and associated with the memory system 214, which may include higher levels of cache and main memory. The processor 204 may be a general purpose processor, a multi-threaded processor, a digital signal processor (DSP), an application specific processor (ASP) or the like. The coprocessor 206 may be a general purpose processor, a digital signal processor, a vector processor, a single instruction multiple data (SIMD) processor, an application specific coprocessor or the like. The various components of the processing complex 200 may be implemented using application specific integrated circuit (ASIC) technology, field programmable gate array (FPGA) technology, or other programmable logic, discrete gate or transistor logic, or any other available technology suitable for an intended application.

The processor 204 includes, for example, an issue and control circuit 216 having a program counter (PC) 217 and execution pipelines 218. The issue and control circuit 216 fetches a packet of, for example, four instructions from the L1 I-cache 210 according to the program order of instructions and from the instruction fetch queue 208 for processing by the execution pipelines 218. If an instruction fetch operation misses in the L1 I-cache 210, the instruction is fetched from the memory system 214 which may include multiple levels of cache, such as a level 2 (L2) cache, and main memory. An instruction fetched from the memory system 214 is decoded in predecoder 211 which determines whether the fetch instruction is a coprocessor instruction. A fetched instruction identified as a coprocessor instruction is encoded with a short identifier, such as having all "1's" in three most significant bit positions in the encoded coprocessor instruction, for example. The encoded coprocessor instruction is then loaded in the instruction cache 210 and forwarded on bypass path 220 to a multiplexer function 219 for faster fetch response time for entering the fetched instruction in the instruction fetch queue 208. The short identifier allows fast decoding for identification of coprocessor instructions in the instruction fetch queue 208. The instruction fetch queue 208 utilizes pointers to control and coordinate forwarding coprocessor instructions to the coprocessor 206 and issuing instructions to the processor 204. The action of copying an instruction from the instruction fetch queue 208 and forwarding the instruction to the coprocessor is called transiting the instruction. For example, a first pointer may be used to indicate which instruction in the instruction fetch queue 208 is the oldest instruction not transited to the coprocessor 206. A second pointer may be used to indicate which instruction in the instruction fetch queue 208 is the oldest instruction not yet issued to the processor 204. Control logic in the instruction fetch queue 208 uses the first pointer, valid bits, and position of the instruction being accessed from the instruction fetch queue 208 to select, for example, up to the next four coprocessor instructions. Generally, each entry in the instruction fetch queue (208) has a "valid bit". These valid bits are attributes that are used by control logic to determine whether an entry has a valid instruction which may be selected for further processing. An entry is invalid initially, because no instruction has been fetched into that location, or a valid entry may become invalid if the instruction associated with that entry needs to be flushed out of the instruction fetch queue 208. It is appreciated that four instructions in a packet may be accessed for execution on the processor 204 or coprocessor 206 depending on the short identifier stored with the encoded instruction in the instruction fetch queue 208. A packet of processor instructions are generally decoded and issued to the execution pipelines 218 in parallel. Since architecturally a packet is not limited to four instructions, more or less than four instructions may be fetched, issued and executed in parallel depending on an implementation and an application's requirements.

The processor complex 200 may be configured to execute instructions under control of a program stored on a computer readable storage medium. For example, a computer readable storage medium may be either directly associated locally with the processor complex 200, such as may be available from the L1 I-cache 210, for operation on data obtained from the L1 D-cache 212, and the memory system 214. A program comprising a sequence of instructions may be loaded to the memory hierarchy 202 from other sources, such as a boot read only memory (ROM), a hard drive, an optical disk, or from an external interface, such as a network.

The coprocessor 206 includes, for example, a coprocessor instruction selector for transit 224, a hybrid instruction queue 225, and a coprocessor execution complex 226. The coprocessor instruction selector for transit 224 may comprise a plurality of multiplexers whose outputs may be coupled to a set of posting registers 209 according to pipeline requirements of the processor 204. A coprocessor select circuit 223 operative to control the coprocessor instruction selector for transit 224 generates selection signals to access the coprocessor instructions from the instruction fetch queue 208. The plurality of multiplexers select one or more coprocessor instructions from the instruction fetch queue 208 skipping over intermixed processor instructions. The number of coprocessor instructions selected depends in part upon availability of space to receive the instructions in the hybrid instruction queue 225. The number of coprocessor instructions that are transited from the instruction fetch queue 208 is kept track of through operation of coprocessor pointers. For example, an end pointer is incremented by the number of coprocessor instructions transited accounting for a posting register, such as posting registers 209 if it is required by pipeline operations. A start pointer is decremented by the number of coprocessor instructions selected from the instruction fetch queue 208.

The hybrid instruction queue 225 comprising an in-order FIFO queue 228, an out-of-order queue 229, with a queue and hazard control circuit 230 configured to manage both queues. Coprocessor instructions are selected from the instruction fetch queue 208 out-of-order with respect to processor instructions and in-order with respect to coprocessor instructions. The hybrid instruction queue 225 is coupled to the instruction fetch queue 208 by means of the coprocessor instruction selector for transit 224. The coprocessor instruction selector for transit 224 has access to a plurality of instructions in the instruction fetch queue 208 and is able to identify coprocessor instructions within the plurality of instructions it has access to for selection. The coprocessor instruction selector for transit 224 copies coprocessor instructions from the instruction fetch queue 208 and provides the copied coprocessor instructions to the hybrid instruction queue 225.

In the hybrid instruction queue 225, when instructions arrive as accessed from the instruction fetch queue 208, the received instructions are stored in the out-of-order queue 229 if there is room therein. Otherwise, the instructions are placed in the FIFO queue 228 and are moved to the out-of-order queue 229 when there is space available in the OoO queue 229. A multiplexer 231 is used to select a bypass path for instructions received from the coprocessor instruction selector for transit 224 or to select instructions received from the FIFO queue 228, under control of the queue and hazard control circuit 230. Dispatching, as used herein, is defined as moving an instruction from the instruction fetch queue 208 to processor 204 or to coprocessor 206. Issuing, as used herein, is defined as sending an instruction, in a standard format, a decoded format, or an elaborated format for example, to an associated execution pipeline within processor 204 or within coprocessor 206.

Coprocessor instructions are written to the OoO queue 229 in the order the coprocessor instructions are received. For a coprocessor having multiple execution pipelines, such as shown in the coprocessor execution complex 226, the coprocessor instructions are read in-order with respect to their target execution pipelines, but may be out-of-order across the target execution pipelines. For example, CX instructions may be executed in-order with respect to other CX instructions, but may be executed out-of-order with respect to CL and CS instructions. In another embodiment, the execution pipelines may individually be configured to be out-of-order. For example, a CX instruction may be executed out-of-order with other CX instructions. However, additional dependency tracking may be required at the execution pipeline level to provide such out-of-order execution capability. The queue and hazard control circuit 230 checks for dependencies between instructions and controls instruction issue to avoid hazards, such as dependency conflicts between instructions. The out-of-order queue 229 is sized so that it is rarely the case that an instruction is kept from dispatching to the coprocessor execution complex 226 due to its being in the in-order queue when it otherwise would have been dispatched if the OoO queue were larger. In an exemplary implementation, the in-order FIFO queue 228 and out-of-order queue 229 are each sixteen entries with the coprocessor having coprocessor store (CS) issue pipeline 236 coupled to a CS execution pipeline 237, a coprocessor load (CL) issue pipeline 238 coupled to a CL execution pipeline 239, and a coprocessor function (CX) issue pipeline 240 coupled to a CX execution pipeline 241. Also, a coprocessor register file (CRF) 242 may be coupled to each execution pipeline.

Coprocessor instructions, especially those for floating-point, SIMD, and other arithmetic operations, often require more pipeline stages to execute than processor instructions. This disparity can create performance bottlenecks when there are instructions which require synchronization between the processor and the coprocessor. For example, when the program flow in the processor is dependent upon a result in the coprocessor, that result should be provided with minimal delay so as not to throttle processor performance. Even without such dependencies, there is a performance advantage to starting coprocessor execution as soon as a coprocessor instruction has been detected in the instruction fetch queue, as this will minimize potential idle cycles in the coprocessor.

In a general implementation, issue logic examines instructions in an issue queue and issues instructions to a processor and to a coprocessor when there is no backpressure from the processor and the coprocessor indicating the instructions are able to be accepted for execution. Backpressure may be caused by the coprocessor having its execution pipeline filled such that the coprocessor cannot accept another instruction. In such a situation, the backpressure from the coprocessor would prevent issue of a processor instruction from the issue queue even if the processor could accept another processor instruction. Backpressure can also be caused by the processor which would prevent a coprocessor instruction from being issued even if the coprocessor could accept the coprocessor instruction. In such a situation, the backpressure from the processor would cause the coprocessor to be idle, where instead it could have made progress in executing the coprocessor instruction. Idle cycles are costly, both in terms of reduced performance and wasted energy. Thus, minimizing backpressure from either the processor or the coprocessor results in overall more efficient execution of code.

The present invention allows coprocessor instructions to be sent, or "transited", to the coprocessor independent of the backpressure from the main processor. In so doing, the coprocessor can begin executing a coprocessor instruction before it would be considered as issued from the processor issue queue, such as the instruction fetch queue 208. Even though coprocessor instructions are transited to the coprocessor 206 they are not removed from the instruction fetch queue 208. The coprocessor instructions remain in the instruction fetch queue 208 to allow the processor 204 to track these coprocessor instructions for purposes of effectively maintaining program order, committing coprocessor instructions for execution, handling of instruction execution requiring operations from both the processor and the coprocessor, and handling flushes, for example. When the processor provides a commit indication for a coprocessor instruction, the processor has determined that the coprocessor instruction will not be flushed and the coprocessor can execute the coprocessor instruction. A coprocessor instruction can be flushed for a variety of reasons including, being in the path of a mispredicted branch, a data abort, an interrupt or the like. A conditional instruction is not flushed if it is determined by flag settings, for example to not execute. In this case, a non-executing conditional coprocessor instruction is executed as a no operation (NOP) instruction.

The processor 204 is generally responsible for ensuring instructions, including coprocessor instructions, complete execution in program order. In the coprocessor, the execution pipelines 237, 239, and 241 perform operations out-of-order with respect to each other. The hazard circuit 230 and an in-order retirement circuit 244 are used to ensure that the internally architected state is updated in program order. The processor 204 is configured to coordinate instruction execution between its pipelines and the coprocessor pipelines. The coprocessor is configured to access memory or peripherals through coordinated operations with the processor.

The processor 204 and coprocessor 206 essentially sync-up when there is a jointly executed instruction. For example, when executing a load instruction, the processor 204 calculates a memory address for data to be fetched, fetches the data from a memory, and sends the data to a coprocessor's load FIFO 416 of FIG. 4. The coprocessor 206 accepts the load data when it is available and then continues with the execution of instructions that are dependent on that data. The behavior is similar for stores except in this case the coprocessor 206 puts store data in a store FIFO 418 of FIG. 4 and the processor 204 accepts it when it is ready. Moving data between registers in the processor 204 and coprocessor 206 is handled in a similar manner.

Figure 2B:
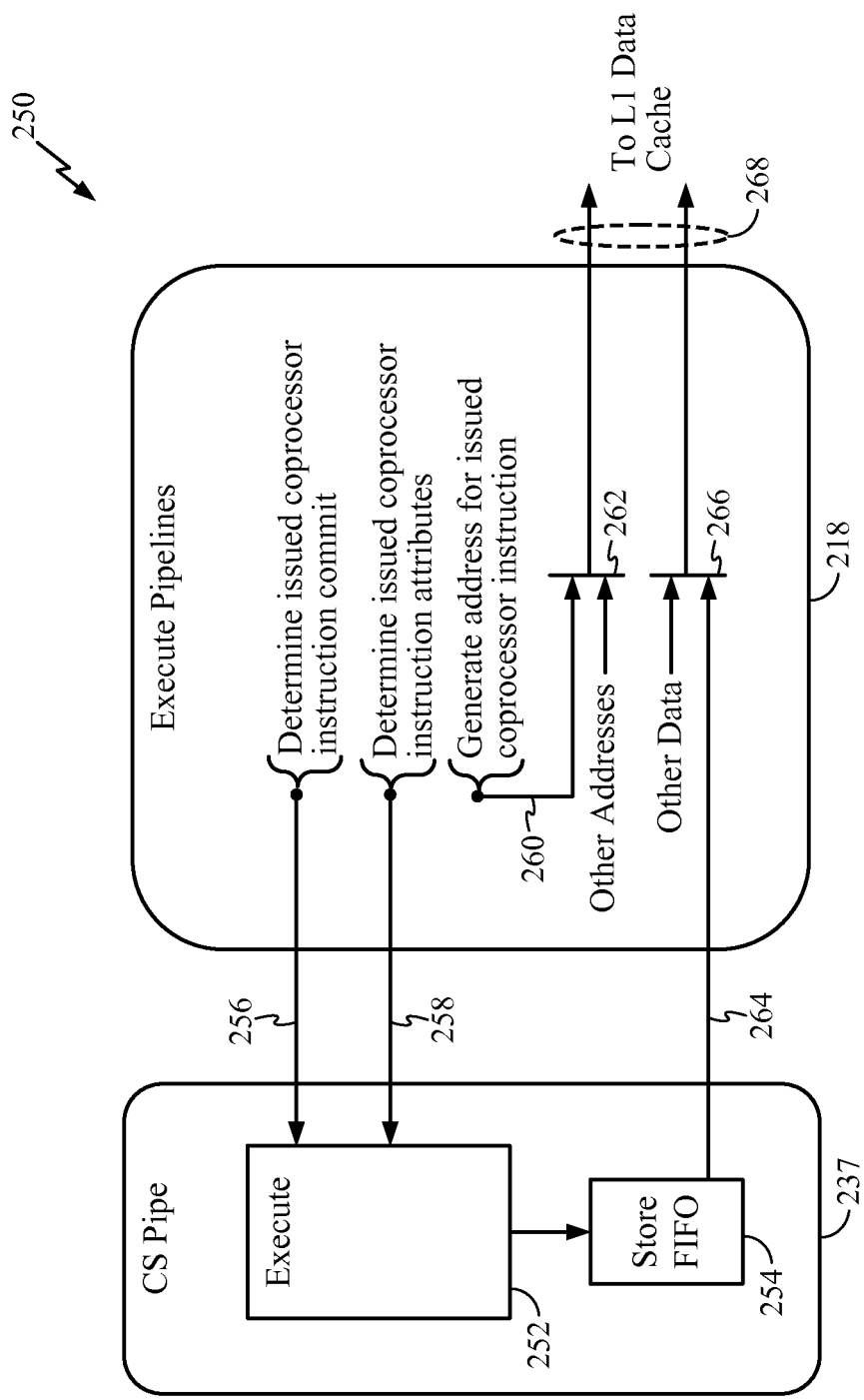
FIG. 2B illustrates exemplary coupling means between the processor and the coprocessor in which an embodiment of the invention may be advantageously employed.

FIG. 2B illustrates exemplary coupling logic 250 between the processor 204 and the coprocessor 206 in accordance with the invention. The CS execution pipeline 237 comprises an execute circuit 252 and a store FIFO 254. The processor execution pipelines 218 comprise circuitry to determine whether an issued coprocessor instruction is to be committed for execution, whether the issued coprocessor instruction requires attributes, such as an address, conditional information, or the like, and to generate an address for the issued coprocessor instruction when required. For an exemplary execution of a coprocessor store instruction, commit information 256 and attribute information 258 is sent to the CS execute circuit 252. The information may be sent over separate signal lines or across a bus. Also, on the coprocessor, the commit information and the required attributes, once received, may be stored wherever the coprocessor instruction is located, such as, in the in-order queue, in the out-of-order queue, or in the CS execution pipeline 237. Certain instructions are executed as a combination of separate operations on the processor 204 and on the coprocessor 206. For example, a coprocessor store operation is a collaboration between the processor 204 and the coprocessor 206 CS execution pipeline 237. The processor 204 performs address generation, permission checking and cache accessing, while the coprocessor 206 resolves data hazards, captures the data, performs necessary data processing, performs data alignment and signals the processor 204 that the data is available to be stored. For example, a data address for the coprocessor store instructions is generated in the processor execution pipelines 218 and selected through a multiplexer, such as multiplexer 262 to address the L1 D-cache 212. The data for the coprocessor store instruction is selected from the store FIFO 254 and sent to the processor over bus 264 to a multiplexer, such as multiplexer 266 to be sent to the L1 D-cache 212, for example over signal interface 268. Often, the coprocessor execution steps take longer than the processor execution steps supporting execution of the same instruction. This embodiment allows the hiding of coprocessor latency behind delays in the processor due to the processor's own backpressure. In this case, the processor is causing the backpressure because it is backed up in its own execution pipes. An embodiment of the invention allows for the coprocessor to start executing coprocessor instructions, rather than becoming idle, in effect, hiding part or all of the latency of the coprocessor instruction execution.

The example illustrated in FIG. 2B for the execution of a coprocessor store instruction does benefit from embodiments of the invention in that execution of the store instruction advances in the coprocessor pipeline, even if the processor 204 is backed up. However, the benefit may in some situations be limited, since the execution of the store instruction cannot advance to the very end of the coprocessor pipeline before it receives certain attributes 258, which the processor 204 can only supply after the store instruction has issued to the processor 204.

There are other cases where the program flow in the processor 204 depends on arithmetic computations in the coprocessor 206, which the coprocessor 206 can execute fully to the end of the coprocessor pipeline without needing any attributes from the processor. An example is execution of one or more long latency arithmetic instructions followed by execution of a dependent compare instruction in the coprocessor 206 and execution of a branch instruction in the processor 204 that depends on the result of the compare. In this example, the entire coprocessor instruction sequence including the compare instruction may be executed to completion before the branch instruction even needs to be issued. When the branch is eventually issued to the processor 204, the compare result on which the branch depends would be already be available, effectively hiding all of the latency associated with the coprocessor instructions.

Figure 3A:
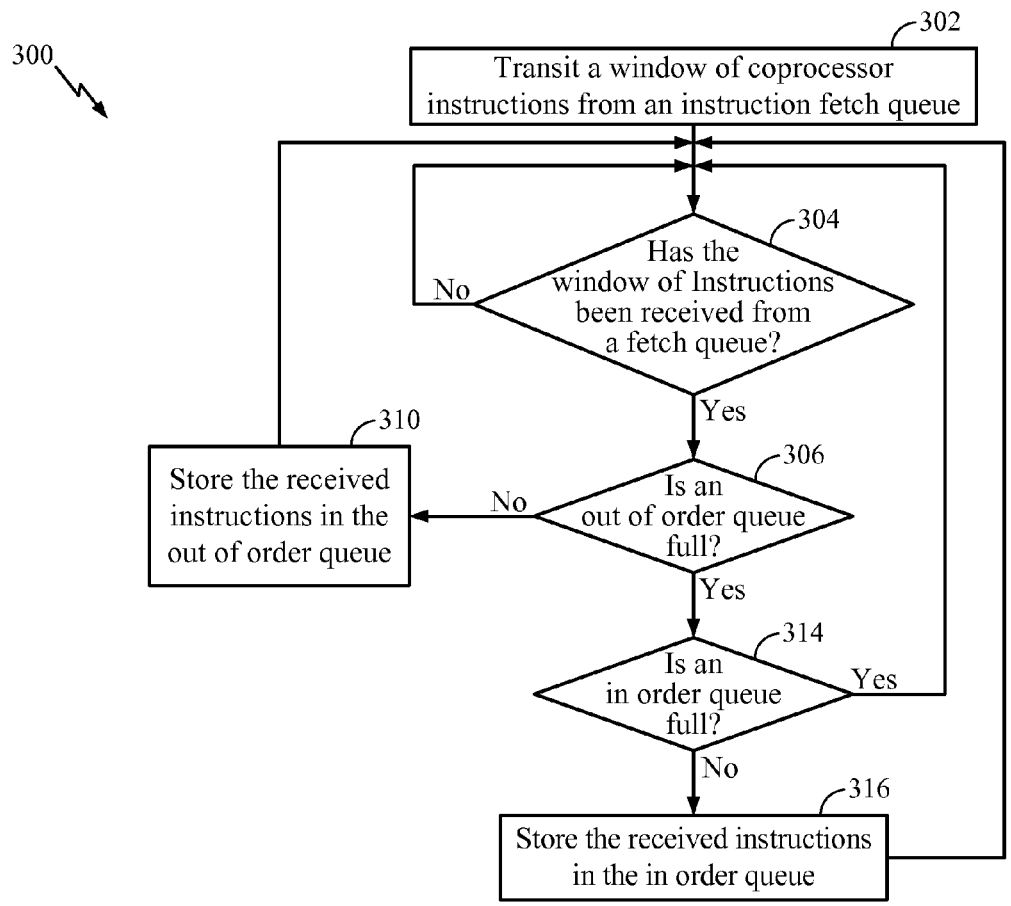
FIG. 3A illustrates a process for providing early access to not-yet-issued instructions in which an embodiment of the invention may be advantageously employed.

FIG. 3A illustrates a process 300 for queuing instructions in accordance with the present invention. The process 300 follows instruction operations in the coprocessor 206. References to previous figures are made to emphasize and make clear implementation details, and not to limit the process to those specific details. At block 302, a window of coprocessor instructions are identified in an instruction queue, such as the instruction fetch queue 208 of FIG. 2A, and transited to the coprocessor 206. The window may be one to N instructions, depending upon the implementation. A window selection function in select circuit 223 selects the applicable class of instructions, coprocessor instructions in this case, and does not select other intermixed instructions, such as processor instructions. To transit the window of instructions, the N coprocessor instructions in the window are copied from the instruction fetch queue 208 and forwarded to the coprocessor 206. At decision block 304, a determination is made whether the window of instructions has been received from the fetch queue. If at least one instruction has not been received, the process 300 waits until an instruction is received. When the window of instructions is received, the process 300 proceeds to decision block 306. At decision block 306, a determination is made whether a queue, such as the out-of-order queue 229, is full of coprocessor instructions. If the out-of-order queue 229 is not full, the process 300 proceeds to decision block 310. At block 310, the received window of instructions is stored in the out-of-order queue 229. Since the window of instructions may be N instructions, N>1, and the out-of-order queue 229 may have room for less than N instructions, the out-of-order queue is filled and the process 300 then returns to decision block 304 to process any remaining instructions from the window of instructions. If the out-of-order queue 229 has room for the window of N instructions, the N coprocessor instructions are stored at block 310. The process 300 then returns to decision block 304 after storing the N instructions to wait till the next window of coprocessor instructions is received.

Returning to decision block 306, if the out-of-order queue 229 is full, the process 300 proceeds to decision block 314. At decision block 314, a determination is made whether the in-order queue 228 is also full. If the in-order queue 228 is full, the process 300 returns to decision block 304 with the received window of coprocessor instructions pending to wait until space becomes available in either the out-of-order queue 229 or the in-order queue 228 or both. An issue process 320, described below, issues instructions from the out-of-order queue 229 which then clears space in the out-of-order queue for new instructions to be received. Returning to decision block 314, if the in-order queue is not full, the process 300 proceeds to block 316. At block 316, the received instruction is stored in the in-order queue 229 and the process 300 returns to decision block 304 to wait until the next window of coprocessor instructions is received.

Figure 3B:
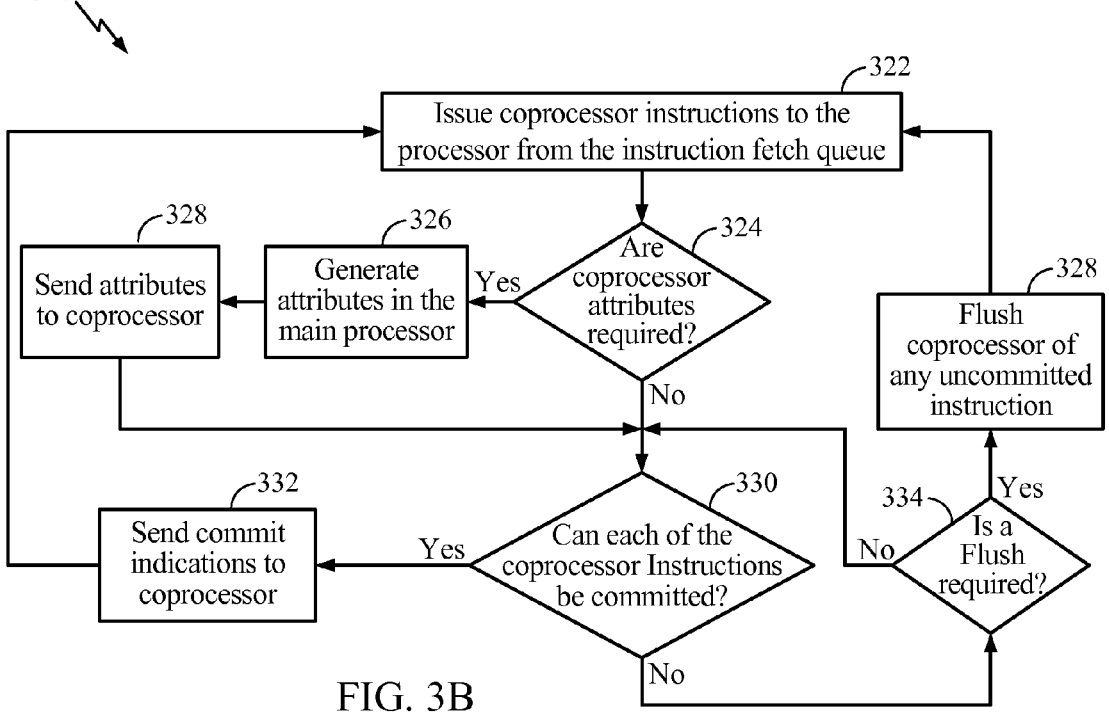
FIG. 3B illustrates a process for communicating information between the coprocessor and the processor in which an embodiment of the invention may be advantageously employed.

FIG. 3B illustrates a process 320 for communicating information between the coprocessor 206 and the processor 204 in accordance with the present invention. At block 322, the window of coprocessor instructions transited from the instruction fetch queue 208 in block 302 of FIG. 3A and still remaining in the instruction fetch queue are now issued to the processor 204. At decision block 324, a determination is made whether coprocessor attributes are required. If coprocessor attributes are required, the process 320 proceeds to block 326. At block 326, the required attributes are generated in the processor 204. Example attributes provided by the processor 204 to the coprocessor 206 include memory alignment information for loads and stores and condition code evaluation for conditionally executed instructions. The memory alignment information for loads is needed to arrange the load data received from memory in a register aligned form prior to writing the load data to a target register. The memory alignment information for stores is needed to arrange the store data read from a register in memory aligned form prior to writing the store data into memory. The condition code evaluation for conditional instructions is needed to determine whether a coprocessor instruction is to be executed or not based on a condition code evaluation done in the processor 204.

At block 328, the generated attributes are sent to the coprocessor and the process 320 proceeds to decision block 330. Returning to decision block 324, if coprocessor attributes are not required, the process 320 proceeds to decision block 330. At decision block 330, a determination is made whether each of the coprocessor instructions can be committed for execution. Since the coprocessor instructions are accessed early prior to being issued to the processor, the program flow that was taken may not require the coprocessor instructions to be executed. However, it is generally expected that most of the early access coprocessor instructions are committed for execution. In such a general case, at block 332, commit information is forwarded to the coprocessor.

The "window" of instructions is generally relevant in the instruction fetch queue 208, where instructions within the window are being considered for issue or transit. Once instructions have issued or transited, the information that they issued or transited from within the same window is not relevant to their execution.

The execute/no-execute interlock between the processor 204 and the coprocessor 206 is based on a commit indication and a flush indication. The processor 204 sends the commit indication when the processor determines a particular instruction can complete execution. This is done in program order, so that the coprocessor 206 can appropriately mark the next instruction in program order as committed. This instruction can be anywhere in the coprocessor 206. It is also possible for there to be a mix of committed and uncommitted instructions in the coprocessor 206, but this is not an arbitrary mix. All uncommitted instructions are by definition younger, later in time in the program flow, than any committed instructions. When the processor 204 determines that the program flow has changed and there are instructions that were previously sent to the coprocessor 206 that should not be executed, the processor 204 sends the flush indication to the coprocessor 206. When the coprocessor 206 receives this flush indication, it flushes away all coprocessor instructions that have not yet received a commit. The flush indication is also used in the processor 204 to flush any uncommitted processor instructions. Coprocessor instructions that have received a commit are kept and executed.

Figure 3C:
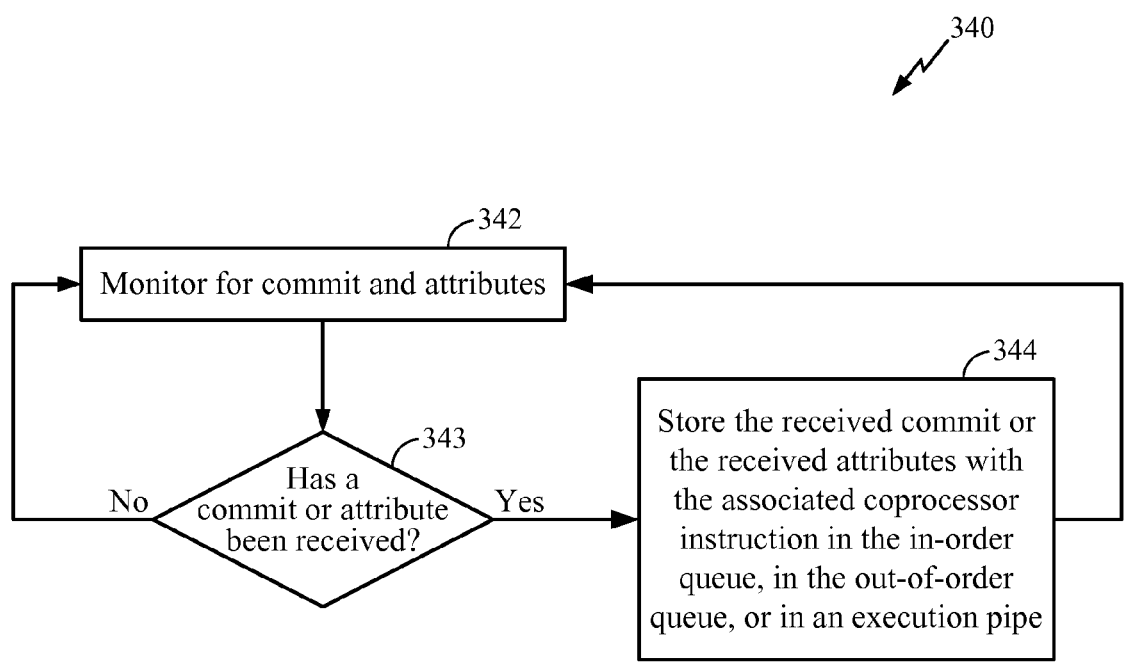
FIG. 3C illustrates a process for updating coprocessor instructions within the coprocessor based on information generated in the processor in which an embodiment of the invention may be advantageously employed.

FIG. 3C illustrates a process 340 for updating coprocessor instructions within the coprocessor based on information generated in the processor in accordance with the present invention. At block 342, the coprocessor monitors for commit and attribute information. At decision block 343, a determination is made whether a commit or attribute information has been received for each instruction of the N coprocessor instruction window. If a commit or attribute information has not been received for each of the N coprocessor instructions, the process 340 returns to block 342. If a commit or attribute information or both have been received for at least one of the N coprocessor instructions, the process 340 proceeds to block 344. At block 344, the received commit or attribute information or both are stored with the associated coprocessor instruction, for example, in the in-order queue 228, in the out-of-order queue 229, or in an associated execution pipe in the coprocessor execution complex 226.

Figure 3D:
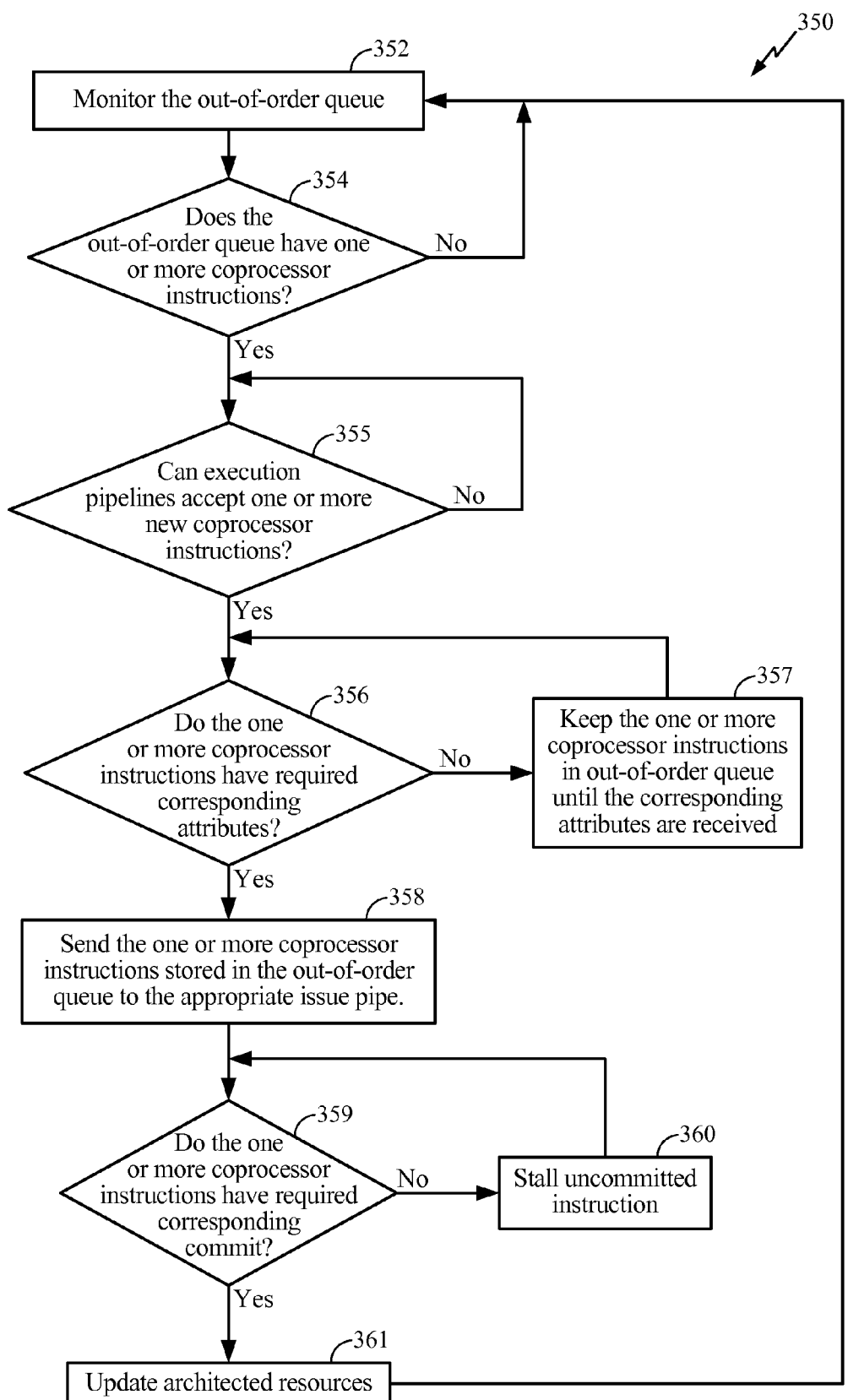
FIG. 3D illustrates a process for issuing coprocessor instructions in which an embodiment of the invention may be advantageously employed.

FIG. 3D illustrates a process 350 for issuing instructions in accordance with the present invention. At block 352, a queue, such as out-of-order queue 229, is monitored for instructions to be executed. At decision block 354, a determination is made whether the out-of-order queue has any instruction entries. If there are no instructions to be executed in the out-of-order queue, the process 350 returns to block 352 to monitor the out-of-order queue. If at least one coprocessor instruction is identified in the out-of-order queue, the process 350 proceeds to decision block 355. At decision block 355, a determination is made whether an execution pipeline is available that can accept a new instruction for execution. If all the execution pipelines are busy, the process 350 waits until an execution pipeline frees up. When an execution pipeline is available to accept a new instruction for execution, the process 350 proceeds to decision block 356. At decision block 356, a determination is made whether the identified coprocessor instruction has required corresponding attributes. If it is determined that the required corresponding attributes are not available, the process 350 proceeds to block 357. At block 357, the identified coprocessor instruction is kept in the out-of-order queue until the required corresponding attribute/s are received. Generally, attributes are needed before a commit indication and attributes are generally needed in order to dispatch into the execution pipes. A coprocessor instruction may advance all the way to the end of a pipeline without having received a commit indication. However, the instruction is not allowed to update any architected resources, such as writing back a register file, until the corresponding commit indication has been received. Returning to decision block 356, if the required corresponding attributes are available, the process 350 proceeds to block 358. At block 358, an instruction, stored in the out-of-order queue, is sent, avoiding hazards such as dependency conflicts between instructions, to an available issue pipeline. If more than one issue pipeline is available, multiple instructions without dependencies from the out-of-order queue may be dispatched out of program order across multiple separate pipelines. If multiple instructions are destined for the same execution pipeline, those instructions may remain in program order. The process 350 proceeds to decision block 359. At decision block 359, a determination is made whether the one or more coprocessor instructions have a required corresponding commit indication. If a particular coprocessor instruction has not received a commit indication the process 350 proceeds to block 360. At block 360, the pipeline associated with the uncommitted instruction is stalled until the commit is received. Returning to decision block 359, if corresponding commit indications have been received, for those associate pipelines, the process 350 proceeds to block 361. At block 361, the architected resources associated with committed and executed coprocessor instructions are updated. The process 350 then returns to block 352.

Once an instruction or instructions are dispatched from the out-of-order queue, space is freed up in the out-of-order queue. New instructions or instructions from the in-order queue may then be stored in the out-of-order queue in preparation for execution, following the queuing process 300 described above. The process 350 proceeds to decision block 360.

Figure 3E:
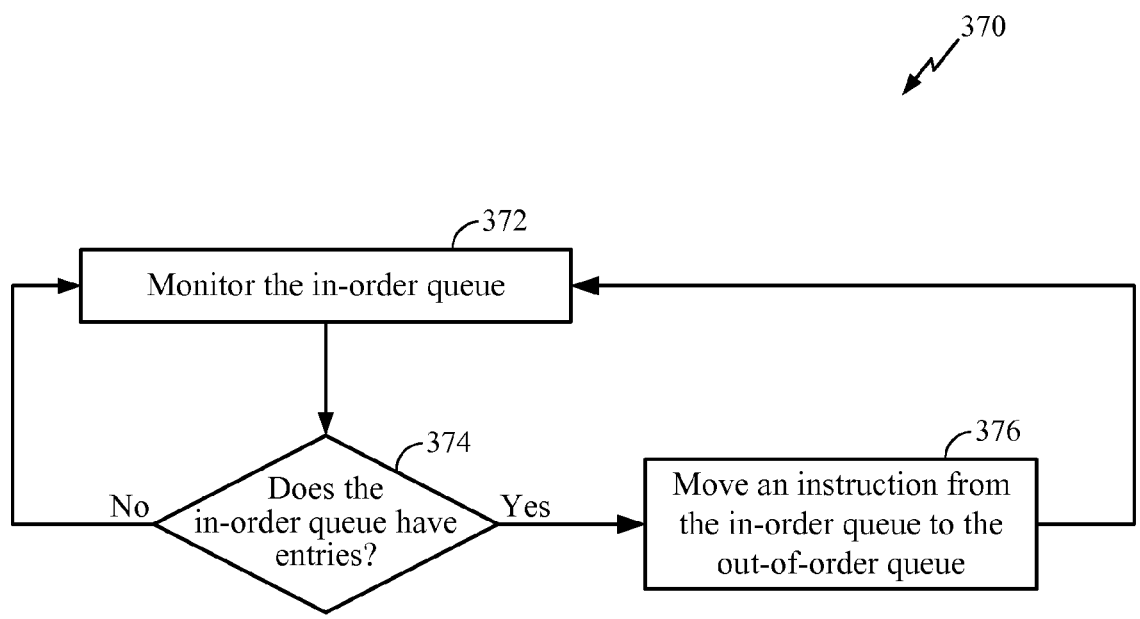
FIG. 3E illustrates a process for moving instructions from the in-order queue to the out-of-order queue in which an embodiment of the invention may be advantageously employed.

FIG. 3E illustrates a process 370 for moving instructions from the in-order queue to the out-of-order queue. Whenever there is space in the out-of-order queue, and one or more instructions exist in the in-order queue, those instructions are moved to the out-of-order queue. At block 372, the process 370 monitors the in-order queue. At decision block 374, a determination is made whether an in-order queue, such as in-order queue 228, has any entries. If the in-order queue does not have any instructions, the process 370 proceeds to block 372. If the in-order queue has one or more instruction entries, the process 370 proceeds to block 376. At block 376, the one or more instructions stored in the in-order queue are moved to space available in the out-of-order queue. The process 370 then returns to block 372 to monitor the in-order queue.

Figure 4:
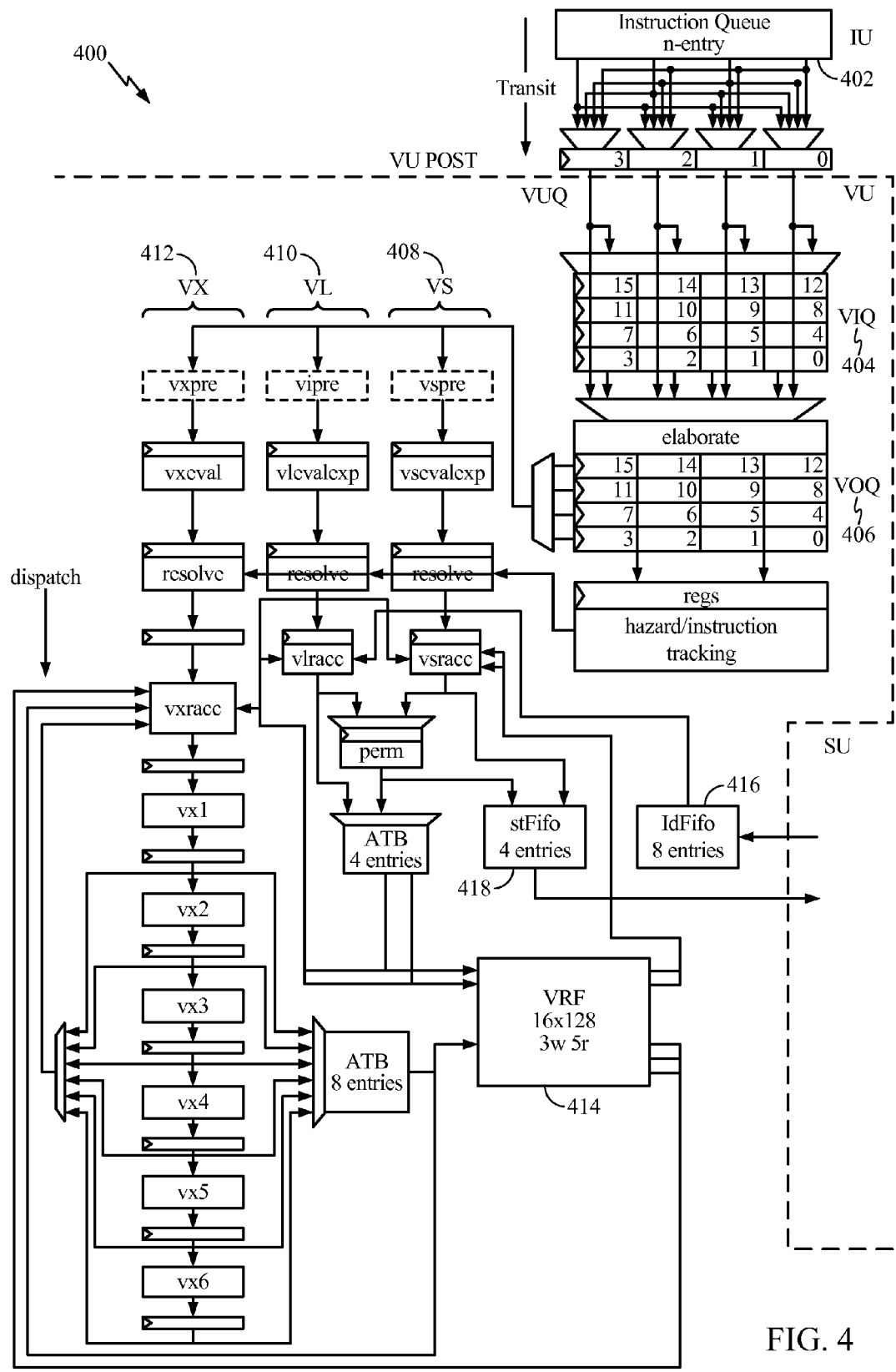
FIG. 4 illustrates an exemplary embodiment of a coprocessor and processor interface in which an embodiment of the invention may be advantageously employed.

FIG. 4 illustrates an exemplary embodiment of a coprocessor and processor system 400 in accordance with the present invention. An n-entry instruction queue 402 corresponds to the instruction fetch queue 208. The coprocessor illustrated in FIG. 4 is a vector processor having a vector in-order queue (VIQ) 404 corresponding to in-order queue 228 and a vector out-of-order queue (VOQ) 406 corresponding to out-of-order queue 229. A vector store pipeline (VS) 408, a vector load pipeline (VL) 410, and a vector function execution pipeline (VX) 412 having six function computation stages (Vx1-Vx6). The VS, VL, and VX pipelines are coupled to a vector register file (VRF) 414 and collectively correspond to the coprocessor execution complex 226.

A load FIFO 416 is used to keep load data received from the processor and acts as buffer storage between the processor 204 and the coprocessor 206. This is advantageous in the case where the coprocessor is backed up and not yet ready to consume the load data, so the load data is written to the load FIFO to prevent the processor 204 from stalling. The store FIFO 418 is a similar buffer storage for store data going from the coprocessor 206 to the processor 204 and is advantageous in the case where the processor 204 is backed up and not yet ready to receive the store data, by holding the store data in the FIFO.

The methods described in connection with the embodiments disclosed herein may be embodied in hardware and used by software from a memory module that stores non-transitory signals executed by a processor. The software module may reside in random access memory (RAM), flash memory, read only memory (ROM), electrically programmable read only memory (EPROM), hard disk, a removable disk, tape, compact disk read only memory (CD-ROM), or any other form of storage medium known in the art. A storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using down loading techniques.

While the invention is disclosed in the context of illustrated embodiments for use in processor systems it will be recognized that a wide variety of implementations may be employed by persons of ordinary skill in the art consistent with the above discussion and the claims which follow below.

What is claimed is:

1. A method for early access of instructions, the method comprising:
    fetching a mix of coprocessor instructions for a coprocessor and processor instructions for a processor from an instruction cache for storage according to a program order of instructions in an instruction fetch queue operating as a first-in first-out (FIFO) queue for the stored processor instructions and the stored coprocessor instructions, as an out-of-order queue for access of the stored coprocessor instructions with respect to the stored processor instructions, and as an in-order queue for access of the stored coprocessor instructions with respect to other stored coprocessor instructions;
    copying a first coprocessor instruction from the instruction fetch queue that is forwarded to the coprocessor, the copied coprocessor instruction selected out-of-order with respect to the stored processor instructions, wherein the mix of coprocessor instructions, including the first coprocessor instruction, and the processor instructions stored in the instruction fetch queue are accessed according to the program order from the instruction fetch queue to be issued to the processor;
    starting execution of the copied first coprocessor instruction in the coprocessor before the first coprocessor instruction is issued from the instruction fetch queue to the processor; and
    completing the execution of the copied first coprocessor instruction in the coprocessor based on information received from the processor after the first coprocessor instruction has been issued from the instruction fetch queue to the processor.

2. The method of claim 1, wherein the starting execution of the copied first coprocessor instruction includes execution of operations specified by the copied first coprocessor instruction without changing processor state.

3. The method of claim 1, wherein the information received from the processor is a commit for execution indication for the copied first coprocessor instruction.

4. The method of claim 1 further comprising:
    issuing the first coprocessor instruction from the instruction fetch queue to the processor;
    processing the issued first coprocessor instruction in the processor to determine attributes of the first coprocessor instruction; and
    storing the attributes with the copied first coprocessor instruction in the coprocessor.

5. The method of claim 1, wherein the information includes data alignment information used to arrange data according to a storage destination or information of a conditional evaluation for a conditionally executed coprocessor instruction.

6. The method of claim 1, wherein starting execution comprises:
    capturing data for storage in response to the copied first coprocessor instruction, wherein the copied first coprocessor instruction is a store instruction.

7. The method of claim 6, wherein completing execution comprises:
    generating a storage address in a memory by the processor; and
    storing the data at the storage address by the processor.

8. The method of claim 1 further comprising:
    encoding a coprocessor instruction fetched from a memory hierarchy with a unique identifier to differentiate coprocessor instructions from processor instructions; and
    storing the encoded coprocessor instruction in the instruction fetch queue.

9. The method of claim 8, wherein the unique identifier is encoded in a predecode operation.

10. The method of claim 1, wherein the information includes data fetched by the processor from a data cache at a location identified by the first coprocessor instruction.

11. An apparatus for early access of instructions, the apparatus comprising:
    a fetch queue coupled to an instruction cache, the fetch queue configured to store a first class of instructions fetched from the instruction cache for a first processor and a second class of instructions fetched from the instruction cache for a second processor, wherein the fetch queue operates as a first-in first-out (FIFO) queue for the first class instructions and the second class instructions which are accessed according to a program order of instructions from a first output of the fetch queue to be issued to the first processor;
    a second class instruction selector coupled to the fetch queue which operates as an out-of-order queue for accessing the second class instructions with respect to the first class instructions from a second output of the fetch queue and is configured to copy the second class instructions in parallel from the second output of the fetch queue skipping over any intermixed first class instructions; and
    a queue coupled to the second class instruction selector, the queue configured to store the copied second class instructions and to issue the copied second class instructions from the queue to start execution of the copied second class instructions by the second processor before the second class instructions are issued to the first processor.

12. The apparatus of claim 11, wherein the fetch queue is further configured to issue the second class of instructions to the first processor which determines whether a second class instruction should be committed for execution.

13. The apparatus of claim 11, wherein the fetch queue is further configured to issue the second class instructions to the first processor which generates addresses and memory alignment information for load and store second class instructions and sends the memory alignment information to the second processor in support of executing the load and store second class instructions on the second processor with the addresses directly provided by the first processor to a data memory.

14. The apparatus of claim 11 further comprising:
a predecoder configured to encode a fetched second class instruction to a new encoding to differentiate the fetched second class instruction from fetched first class instructions.

15. The apparatus of claim 11, wherein the second class instruction selector comprises:
a set of multiplexors configured to select one or more second class instructions in parallel from the second output of the fetch queue skipping over any of the intermixed first class instructions stored in the fetch queue and maintaining program order of the selected second class instructions.

16. A method for starting execution of not-yet issued instructions, the method comprising:
fetching a mix of coprocessor instructions for a coprocessor and processor instructions for a processor according to program order from an instruction cache for storage in an instruction fetch queue operating as a first-in first-out (FIFO) queue for the stored processor instructions and the stored coprocessor instructions, as an out-of-order queue for access of the stored coprocessor instructions with respect to the stored processor instructions, and as an in-order queue for access of the stored coprocessor instructions with respect to other stored coprocessor instructions;
copying a plurality of coprocessor instructions from an instruction fetch queue that is forwarded to the coprocessor, the copied coprocessor instruction selected out-of-order with respect to the stored processor instructions; and
starting parallel execution of the plurality of copied coprocessor instructions in the coprocessor before the plurality of coprocessor instructions are issued from the instruction fetch queue to a processor, wherein the parallel execution of the plurality of copied coprocessor instructions is completed in the coprocessor based on information generated by the processor in response to an evaluation of the plurality of coprocessor instructions issued from the instruction fetch queue to the processor.

17. The method of claim 16 further comprising:
copying the plurality of coprocessor instructions from the instruction fetch queue skipping over any intermixed processor instructions.

18. The method of claim 16 further comprising:
encoding a plurality of fetched coprocessor instruction by a predecoder to a new encoding to differentiate the plurality of fetched coprocessor instruction from fetched processor instructions.

19. The method of claim 16 further comprising:
fetching data from a memory at a storage address generated by the processor in response to a load instruction selected from the plurality of coprocessor instructions; and
sending the data, representing the information generated by the processor, from the processor for storage in a load first-in first-out (FIFO) file in the coprocessor providing buffer storage of the information between the processor and the coprocessor.

20. The method of claim 19 further comprising:
operating on the data accessed from the load FIFO file in the coprocessor according to a coprocessor function instruction.

21. The method of claim 16, wherein the plurality of coprocessor instructions copied from an instruction fetch queue are stored in an out-of-order queue in the coprocessor.

22. An apparatus for early access of instructions, the apparatus comprising:
means for storing a first class of instructions fetched from an instruction cache for a first processor and a second class of instructions fetched from the instruction cache for a second processor in a fetch queue, wherein the fetch queue operates as a first-in first-out (FIFO) queue for the first class of instructions and the second class of instructions which are accessed according to a program order of instructions from a first output of the fetch queue to be issued to the first processor;
means for copying second class instructions in parallel from a second output of the fetch queue which operates as an out-of-order queue for accessing the second class instructions with respect to the first class instructions and skipping over any intermixed first class instructions; and
means for storing the copied second class instructions and for the issuing the copied second class instructions from the queue to start execution of the copied second class instructions by the second processor before the second class instructions are issued from the first output of the fetch queue to the first processor.

23. The apparatus of claim 21, wherein a fetched instruction is received in response to a operation, upon a miss in the instruction cache, from a bypass path around the instruction cache to store the fetched instruction in the fetch queue and wherein the fetched instruction is a first class type of instruction or a second class type of instruction.

24. A computer readable non-transitory medium encoded with computer readable program data and code, the program data and code when executed on a computer system executes a method comprising:
fetching a mix of coprocessor instructions for a coprocessor and processor instructions for a processor from an instruction cache for storage according to a program order of instructions in an instruction fetch queue operating as a first-in first-out (FIFO) queue for the stored processor instructions and the stored coprocessor instructions, as an out-of-order queue for access of the stored coprocessor instructions with respect to the stored processor instructions, and as an in-order queue for access of the stored coprocessor instructions with respect to other stored coprocessor instructions;
copying a first coprocessor instruction from the instruction fetch queue that is forwarded to the coprocessor, the copied coprocessor instruction selected out-of-order with respect to the stored processor instructions, wherein the mix of coprocessor instructions, including the first coprocessor instruction, and the processor instructions stored in the instruction fetch queue are accessed according to the program order from the instruction fetch queue to be issued to a processor;
starting execution of the copied first coprocessor instruction in the coprocessor before the first coprocessor instruction is issued from the instruction fetch queue to the processor; and
completing the execution of the copied first coprocessor instruction in the coprocessor based on information received from the processor after the first coprocessor instruction has been issued from the instruction fetch queue to the processor.

* * * * *